(12) United States Patent
Kim

(10) Patent No.: US 8,121,927 B2
(45) Date of Patent: Feb. 21, 2012

(54) METHOD OF OPTIMUM AUCTION USING NETWORK SERVICE

(76) Inventor: Dae-Yeol Kim, Yongin-si (KR)

( * ) Notice: Subject to any disclaimer, the term of this patent is extended or adjusted under 35 U.S.C. 154(b) by 1333 days.

(21) Appl. No.: 10/598,860

(22) PCT Filed: Mar. 17, 2005

(86) PCT No.: PCT/KR2005/000764
§ 371 (c)(1),
(2), (4) Date: Sep. 13, 2006

(87) PCT Pub. No.: WO2005/088501
PCT Pub. Date: Sep. 22, 2005

(65) Prior Publication Data
US 2007/0179878 A1    Aug. 2, 2007

(30) Foreign Application Priority Data

Mar. 17, 2004 (KR) .................. 10-2004-0017940
Mar. 14, 2005 (KR) .................. 10-2005-0020866

(51) Int. Cl.
*G06Q 40/00* (2006.01)
(52) U.S. Cl. .......................................................... 705/37
(58) Field of Classification Search ............... 705/38
See application file for complete search history.

(56) References Cited

U.S. PATENT DOCUMENTS

| 6,647,373 | B1 |  | 11/2003 | Carlton-Foss | |
|---|---|---|---|---|---|
| 7,634,439 | B1 | * | 12/2009 | Smith | 705/37 |
| 7,636,687 | B2 | * | 12/2009 | Foster et al. | 705/38 |
| 2002/0010674 | A1 | * | 1/2002 | Kent | 705/37 |
| 2002/0062277 | A1 | * | 5/2002 | Foster et al. | 705/38 |
| 2002/0161662 | A1 | * | 10/2002 | Bredow et al. | 705/26 |
| 2003/0093357 | A1 |  | 5/2003 | Guler et al. | |
| 2004/0039678 | A1 | * | 2/2004 | Fralic | 705/37 |
| 2004/0148241 | A1 | * | 7/2004 | Qi et al. | 705/36 |
| 2005/0038723 | A1 | * | 2/2005 | Nishimaki | 705/35 |

FOREIGN PATENT DOCUMENTS

JP    2002-032614 A    1/2002

(Continued)

OTHER PUBLICATIONS

Dann, Liam, "Tenants in rent auction as property starts to boom", Sunday Star—Times. Wellington, New Zealand: Feb. 3, 2002. p. E.1.*

(Continued)

*Primary Examiner* — Ella Colbert
*Assistant Examiner* — Mohammad Z Shaikh
(74) *Attorney, Agent, or Firm* — Park & Associates IP Law, P.C.

(57) ABSTRACT

An optimum auction method using a network is disclosed. Especially, being different from a typical auction method for simply evaluating a personally proposed bod price, the optimum auction method evaluates various evaluation particulars for the auction and evaluation methods in overall, thereby selecting an optimum bidder who is close to an intention or taste of an auction initiator or able to maximize a profit even though the selected optimum bidder does not propose the highest or the lowest bid price. Accordingly, it is also possible to broaden a range of participation and improve efficiency on the auction. Also, there are various types of the optimum auction method including a reverse auction, a lease auction and a reverse lease auction which can proceed with various trading methods by maximizing the profit of the auction initiator.

7 Claims, 11 Drawing Sheets

FOREIGN PATENT DOCUMENTS

| | | |
|---|---|---|
| JP | 2003-076926 A | 3/2003 |
| JP | 2003-099680 | 4/2003 |
| JP | 2003-099680 A | 4/2003 |
| KR | 10-2000-0054546 A | 9/2000 |
| KR | 10-2000-0054554 A | 9/2000 |
| KR | 1020000054546 | 9/2000 |
| KR | 1020000054554 | 9/2000 |
| KR | 10-2002-0023831 A | 3/2002 |
| KR | 1020020023831 | 3/2002 |
| KR | 10-2002-0073101 A | 9/2002 |
| KR | 1020020073101 | 9/2002 |

OTHER PUBLICATIONS

Wallis, Anna, "Students to bid for rent", Manawatu Standard. Palmerston North, New Zealand: Mar. 3, 2003. p. 3.*

* cited by examiner

FIG. 4

Exemplary auction trading according to an evaluation table based on overall evaluation marks
- ✧ Conditions set by an auction initiator
  - -essential assets: a vehicle with a bid price lower than approximately 15,000,000 wons and a displacement greater than approximately 2,000 cc
  - -evaluation conditions: evaluation particulars and evaluation reference marks
    - * price: 10 points for below approximately 13,000,000 wons, 20 points for below approximately 12,000,000 wons and 30 points for below approximately 10,000,000 wons
    - * displacement: 5 points for each 100 cc when exceeding approximately 2,000 cc
    - * manufacturing company: 10 points for Hyundai, 5 points for Toyota and 3 points for other companies
    - * color: 10 points for white, 5 points for blue and 3 points for red
  - -evaluation method: overall mark-based evaluation (priority rank evaluation for those receiving the same mark)
    - *priority rank: 1. price
      - 2. manufacturing company
      - 3. color
      - 4. displacement

| Classification | Price | | Manufacturing Company | | Color | | Displacement | | Evaluation Result | |
|---|---|---|---|---|---|---|---|---|---|---|
| | Proposal | Score | Proposal | Score | Proposal | Score | Proposal | Score | Total | Rank |
| Participant 1 | 9,500,000 wons | 30 | Hyundai | 10 | White | 10 | 2,000 cc | 0 | 50 | 1 |
| Participant 2 | 11,000,000 wons | 20 | Toyota | 5 | Blue | 5 | 2,150 cc | 5 | 35 | 2 |
| Participant 3 | 13,000,000 wons | 10 | Honda | 3 | Red | 3 | 2,250 cc | 10 | 26 | 4 |
| Participant 4 | 12,000,000 wons | 20 | Hyundai | 10 | Silver | 0 | 2,150 cc | 5 | 35 | 3 |
| Participant 5 | 14,000,000 wons | 0 | Ford | 3 | Black | 0 | 2,350 cc | 15 | 18 | 5 |

FIG. 5

Exemplary auction trading according to an evaluation table based on overall evaluation marks
✧ Conditions set by an auction initiator
    -essential assets: a flight ticket departing on December 1, 2005 from Incheon Airport to San Francisco, a fare lower than approximately 1,200,000 wons
    -evaluation conditions: evaluation particulars and evaluation reference marks
        * price: 5 points for every balance 100,000 wons from approximately 1,200,000 wons
        * travel path: 10 points for non-stop and 5 points for one stop-over
        * seat preference: 5 points for a window-side seat, 3 points for an aisle-side seat and 1 point for a middle seat
        * flight company: 10 points for Korean Air Lines (KAL), 5 points for UA and 3 points for other flight companies
    -evaluation method: overall mark-based evaluation

| Classification | Price | | Travel Path | | Seat | | Flight Company | | Evaluation Result | |
|---|---|---|---|---|---|---|---|---|---|---|
| | Proposal | Score | Proposal | Score | Proposal | Score | Proposal | Score | Total | Rank |
| Participant 1 | 900,000 wons | 15 | Non-stop | 10 | Window-side | 5 | KAL | 10 | 40 | 1 |
| Participant 2 | 1,100,000 wons | 5 | One stop-over | 5 | Middle | 1 | Thai Airways International | 3 | 14 | 4 |
| Participant 3 | 1,000,000 wons | 10 | Non-stop | 10 | Aisle-side | 3 | UA | 5 | 28 | 2 |
| Participant 4 | 1,200,000 wons | 0 | Non-stop | 10 | Window-side | 5 | JAL | 3 | 18 | 3 |

FIG. 6A

Exemplary auction trading according to a schedule table
- Conditions set by a lessor
  - minimum unit leasing period: more than 2 consecutive days
  - time limit for determining a leasing period: prior to 4 days from a desired lease date including 2 days of a transfer period
  - evaluation method for bidders: overall evaluation method or a rank-based evaluation method
  - priority rank when applying the rank-based evaluation method: 1. total price
    2. average unit price
    3. first-come first-served basis
  - the consecutive lease application is evaluated as one application without being divided

- Example of a status of an auction trading

| Schedule | | Status of Lease | Setting of Lease-Wanted Person | | | Date and Time for Lease Determination | Requesting of Rent-Wanted Person | | |
|---|---|---|---|---|---|---|---|---|---|
| Month, Year | Date | | Successful Bid Condition | Minimum Lease Price | Immediate Lease Price | | Dong-Ryeol Sun | Dong-Won Choi | Tae-Jee Seo |
| April, 2004 | 1 | Leased | Overall Evaluation | 10000 | 50000 | | – | – | – |
| | 2 | Leased | Overall Evaluation | 10000 | 50000 | | – | – | – |
| | 3 | Unavailable | Overall Evaluation | 10000 | 50000 | Unavailable Transfer of Lease | – | – | – |
| | 4 | Unavailable | Overall Evaluation | 10000 | 50000 | Unavailable Transfer of Lease | – | – | – |
| | 5 | Available | Overall Evaluation | 10000 | 50000 | April, 1 00:00 | | | |

FIG. 6B

|   | 6 | Available | Overall Evaluation | 15000 | 60000 | April, 2 00:00 |       | 30000 |       |
|---|---|-----------|--------------------|-------|-------|----------------|-------|-------|-------|
|   | 7 | Available | Overall Evaluation | 15000 | 60000 | April, 2 00:00 |       | 30000 |       |
|   | 8 | Available | Overall Evaluation | 15000 | 60000 | April, 2 00:00 | 40000 | 30000 |       |
|   | 9 | Available | Overall Evaluation | 15000 | 60000 | April, 2 00:00 | 40000 | 40000 |       |
|   | 10 | Available | Overall Evaluation | 15000 | 60000 | April, 2 00:00 | 40000 | 40000 |       |
|   | 11 | Available | Overall Evaluation | 15000 | 60000 | April, 2 00:00 | 40000 |       |       |
|   | 12 | Available | Overall Evaluation | 15000 | 60000 | April, 2 00:00 |       |       | 50000 |
|   | 13 | Available | Overall Evaluation | 15000 | 60000 | April, 2 00:00 |       |       | 50000 |
|   | 14 | Available | Overall Evaluation | 15000 | 60000 | April, 2 00:00 |       |       | 50000 |
|   | 15 | Available | Overall Evaluation | 15000 | 60000 | April, 2 00:00 |       |       | 50000 |
|   | 16 | Unavailable | No Lease | No Lease | No Lease | Unavailable | – | – | – |
|   | 17 | Unavailable | No Lease | No Lease | No Lease | Unavailable | – | – | – |
|   | 18 | Unavailable | No Lease | No Lease | No Lease | Unavailable | – | – | – |
|   | 19 | Unavailable | No Lease | No Lease | No Lease | Unavailable | – | – | – |
|   | 20 | Unavailable | No Lease | No Lease | No Lease | Unavailable | – | – | – |
|   | 21 | Available | Overall Evaluation | 30000 | 60000 | April, 17 00:00 |       |       |       |
|   | 22 | Available | Overall Evaluation | 25000 | 60000 | April, 18 00:00 |       | 50000 |       |
|   | 23 | Available | Overall Evaluation | 25000 | 70000 | April, 18 00:00 |       | 50000 |       |
|   | 24 | Available | Overall Evaluation | 25000 | 70000 | April, 18 00:00 |       | 40000 |       |
|   | 25 | Available | Overall Evaluation | 25000 | 70000 | April, 18 00:00 |       |       |       |

FIG. 6C

| | | | | | | | | |
|---|---|---|---|---|---|---|---|---|
| | 26 | Available | Overall Evaluation | 25000 | 70000 | April, 18 00:00 | | | |
| | 27 | Available | Rank-based Evaluation | 25000 | 70000 | April, 23 00:00 | 30000 | 25000 | 35000 |
| | 28 | Available | Rank-based Evaluation | 25000 | 70000 | April, 23 00:00 | 30000 | 45000 | 35000 |
| | 29 | Unavailable | | Unavailable | Unavailable | Unavailable | – | – | – |
| | 30 | Unavailable | | Unavailable | Unavailable | Unavailable | – | – | – |

FIG. 7A

Exemplary auction trading according to a schedule table
✧ Conditions set by a lessor
   -minimum unit leasing period: more than 2 consecutive days
   -time limit for determining a leasing period: prior to 4 days from a desired lease date including 2 days of a transfer period
   -evaluation method for bidders: overall evaluation method or a rank-based evaluation method
   -priority rank when applying the rank-based evaluation method: 1. average unit price
      2. total price
      3. first-come first-served basis
   -the consecutive lease application is evaluated as one application without being divided ✧ Example of a status of an auction trading

| Schedule | | Status of Lease | Setting of Lease-Wanted Person | | | Date and Time for Lease Determination | Requesting of Rent-Wanted Person | | |
|---|---|---|---|---|---|---|---|---|---|
| Month, Year | Date | | Successful Bid Condition | Minimum Lease Price | Immediate Lease Price | | Dong-Ryeol Sun | Dong-Won Choi | Tae-Jee Seo |
| April, 2004 | 1 | Leased | Overall Evaluation | 10000 | 50000 | | – | – | – |
| | 2 | Leased | Overall Evaluation | 10000 | 50000 | | – | – | – |
| | 3 | Unavailable | Overall Evaluation | 10000 | 50000 | Unavailable Transfer of Lease | – | – | – |
| | 4 | Unavailable | Overall Evaluation | 10000 | 50000 | Unavailable Transfer of Lease | – | – | – |
| | 5 | Available | Overall Evaluation | 10000 | 50000 | April, 1 00:00 | | | |

FIG. 7B

| | | | | | | | | |
|---|---|---|---|---|---|---|---|---|
| | 6 | Available | Overall Evaluation | 15000 | 60000 | April, 2 00:00 | | 40000 | |
| | 7 | Available | Overall Evaluation | 15000 | 60000 | April, 2 00:00 | 30000 | 40000 | |
| | 8 | Available | Overall Evaluation | 15000 | 60000 | April, 2 00:00 | 30000 | 40000 | |
| | 9 | Available | Overall Evaluation | 15000 | 60000 | April, 2 00:00 | 30000 | 40000 | |
| | 10 | Available | Overall Evaluation | 15000 | 60000 | April, 2 00:00 | | 40000 | |
| | 11 | Available | Overall Evaluation | 15000 | 60000 | April, 2 00:00 | | | |
| | 12 | Available | Overall Evaluation | 15000 | 60000 | April, 2 00:00 | | | 50000 |
| | 13 | Available | Overall Evaluation | 15000 | 60000 | April, 2 00:00 | | | 50000 |
| | 14 | Available | Overall Evaluation | 15000 | 60000 | April, 2 00:00 | | | 50000 |
| | 15 | Available | Overall Evaluation | 15000 | 60000 | April, 2 00:00 | | | |
| | 16 | Unavailable | No Lease | No Lease | No Lease | Unavailable | – | – | – |
| | 17 | Unavailable | No Lease | No Lease | No Lease | Unavailable | – | – | – |
| | 18 | Unavailable | No Lease | No Lease | No Lease | Unavailable | – | – | – |
| | 19 | Unavailable | No Lease | No Lease | No Lease | Unavailable | – | – | – |
| | 20 | Unavailable | No Lease | No Lease | No Lease | Unavailable | – | – | – |
| | 21 | Available | Overall Evaluation | 30000 | 60000 | April, 17 00:00 | | | |
| | 22 | Available | Overall Evaluation | 25000 | 60000 | April, 18 00:00 | | 50000 | |
| | 23 | Available | Overall Evaluation | 25000 | 70000 | April, 19 00:00 | | 50000 | |
| | 24 | Available | Overall Evaluation | 25000 | 70000 | April, 20 00:00 | | 40000 | |

FIG. 7C

|  | 25 | Available | Rank-based Evaluation | 25000 | 70000 | April, 21 00:00 |  |  |  |
|---|---|---|---|---|---|---|---|---|---|
|  | 26 | Available | Rank-based Evaluation | 25000 | 70000 | April, 22 00:00 | 30000 |  |  |
|  | 27 | Available | Rank-based Evaluation | 25000 | 70000 | April, 22 00:00 | 30000 | 40000 | 25000 |
|  | 28 | Available | Rank-based Evaluation | 25000 | 70000 | April, 22 00:00 | 30000 | 40000 | 35000 |
|  | 29 | Unavailable |  | Unavailable | Unavailable | Unavailable | — | — | — |
|  | 30 | Unavailable |  | Unavailable | Unavailable | Unavailable | — | — | — |

METHOD OF OPTIMUM AUCTION USING NETWORK SERVICE

TECHNICAL FIELD

The present invention relates to an optimum auction method by using a network service, and more particularly, to a method for selecting one participant who is most close to an intention or a taste of an auction initiator or is able to maximize a profit of the auction initiator as a successful bidder even though the selected participant is not the highest bidder or the lowest bidder through diversifying evaluation particulars for the auction and evaluation methods and then evaluating the diversified evaluation particulars and methods instead of simply evaluating personally proposed prices and to an optimum auction method capable of maximizing a profit of the auction initiator through various auction types such as a reverse auction, a lease auction, a reverse lease auction and so on by using a communication network like the internet.

BACKGROUND ART

An auction is classified into a seller-based auction and a buyer-based auction, which are expressed as an auction in general. In some occasions, the seller-based auction is called "auction" while the buyer-based auction is called "reverse auction." Also, "lease" is a term used for taking a profit by renting a property of a lessor to a lessee, and "rent" is a term used for paying a certain amount of money for using a property of an owner. In frequent cases, these two terms are commonly used as "lease" or "hire of things" without distinction.

In various types of auctions, the most important fact is to maximize a profit of an auction initiator, and this maximization of the profit is the purpose of the auction. Therefore, in the seller-based auction, the highest bidder will become a successful bidder, whereas in the buyer-based auction, the lowest bidder will become a successful bidder. However, in a typical auction or reverse auction, it usually proceeds with selecting a successful bidder who bids the highest or the lowest price among many participants by simply comparing prices proposed by the participants. Thus, through this selection method, it is limited to maximize the profit of the auction initiator, and also, a participation range in the auction is unnecessarily restrictive, resulting in inefficient proceeding of the auction.

Under the generally practiced selection method of the typical auction, even though a bidder provides a better option or an additional condition, the bidder is not allowed to be selected if the bidder proposes a lower price. Thus, the seller loses a chance to get an additional advantage other than the price, and those bidders who can offer the better options or conditions are not willing to participate in the auction, and as a result, numerous competitions may not achieved, reducing an efficiency of the auction. Particularly, as for the lease auction, there may be a case that a number of bidders are grouped together because of a certain schedule of the lease. However, the typical auction selection method that evaluates only the prices proposed by the individual bidders selects a bidder who proposes a higher price even though the group of bidders provides the better condition. Accordingly, there may be a problem in that the lessor is not able to maximize the profit.

DISCLOSURE

Technical Problem

An object of the present invention is to provide an optimum auction method by using a network such as the internet in which a system for providing an auction service for trading items between participants is constructed.

Another object of the present invention is to provide an optimum reverse auction method in which a person who holds an auction is opposite to a typical auction method.

Further object of the present invention is to provide an optimum reverse auction method in which a person who pays a bid price is opposite to the typical auction method.

Further another object of the present invention is to provide an optimum reverse auction in which a person who holds an auction is opposite to the typical auction method and a person who pays a bid price is opposite to the typical auction method.

Technical Solution

According to one aspect of the present invention, there is provided an optimum auction method using a network.

Although an item to be auctioned by an auction initiator of a reverse auction can be a specified unique item such as a particular product of a specific company, any item can be auctioned as long as essential assets are satisfied. Also, most of auction initiators define certain particulars that are not much important to be considered as the essential assets but cannot be negligible, and thus, these particulars should be evaluated appropriately. That is, these particulars should be reflected on an evaluation for the auction to maximize a profit of the auction initiator or make these particulars to be close to an intention or taste of the auction initiator. For instance, if the auction initiator prefers a window-side seat, although setting the window-side seat as one of the essential assets is possible, this preference can be applied as one evaluation particular, giving a priority to a person who suggests the window-side seat or causing the person who suggest the window-side seat to be selected as a successful bidder even though the window-side seat is more expensive than an aisle-side seat. If there is a cost-burden for choosing the window-side seat, it is also possible to set an evaluation particular of a price such that a person who suggests the aisle-side seat is selected as a successful bidder.

Hence, when a reverse auction is performed, the essential assets are first set and those particulars to be evaluated along with a bid price are also set. Then, the bid price and the particulars are assigned with reference marks and ranks, being followed by the application of an auction trading. As a result, proposals made by the auction participants are subjected to an overall evaluation, so that a bidder who is able to maximize a profit or close to an intention or taste of the auction initiator is selected as an optimum bidder. Herein, the auction initiator can set the evaluation particulars discretionarily, and the evaluation particulars may be a single or multiple numbers.

Since the above described trading for the auction sets the essential assets that are critical for realizing the auction trading, there is less limitation in participating in the auction, and even if a participant who is inferior in respect of a bid price, but has a particular that may make the participant superior to the other participants, a fair evaluation is also achieved, thereby providing a rational trading along with increasing the number of participants in the auction.

In case of an auction for a hire of things, an additional evaluation method can be added to the above-described auction trading method to maximize the profit of the auction initiator. Among the participants, those groups applicable for a common hire of things according to a schedule of the hire of things are combined for every number of cases, and a comparative evaluation in individuals, between the selected individual and the combined group, or between the combined group and another combined group is carried out to select such an individual or a group being able to maximize the profit of the auction initiator or having an optimum condition that satisfies the preset evaluation reference, for instance, a certain preference of the auction initiator.

In addition to the bid price, the hire of things includes other variables such as a lease schedule. A desired period of each person who wishes to apply for the hire of things may be different or identical, and in some cases, some dates of the desired periods applied by the individuals are overlapped with each other. In this case, the typical auction method is not effective to select an optimum bidder and maximize the profit since the desired dates and periods applied by the auction participants need to be compared with each other in addition to proposed bid prices.

As a reference, the commonly practiced method for the hire of things is carried out according to a period and a bid price which are already preset. Even in the case of auctioning this type of the hire of things, it is practiced very limitedly.

For instance, according to the common method for the hire of things, the unit periods for the hire of things are set for short-term periods, for instance, one day and two days, and the proposed bid prices for the one day and the two days are compared with each other to select the highest bidder. However, in this common method of hire of things, only those people who wish to apply for the short-term hire of things can participate in the auction. Thus, it may be difficult to provoke the participation and competition among those people who wish to apply for a long-term hire of things, thereby resulting in an ineffective auction. The reason for this low participation and competition is because there is no guarantee for those people who wish to apply for the long-term hire of things to obtain next contracts consecutively.

For instance, when there is a person who wishes to rent a bag for a 7-day trip, getting contracts for the first 3 days and another contract for the last 2 days is useless because of those non-contracted 2 days. Therefore, the actual trading and participation of people who apply for the auction are limited, and it is inconvenient to apply for the long-term hire of things because the auction is carried out under a short-term period. Also, because of numerous short-term auctions, distribution costs including a transfer cost increase, thereby reducing the reality of the trading.

Even though the unit periods of the hire of things are elongated for about one week, about 10 days and about one month, the same problems arise. Those people who want to apply for the hire of things less than these unit periods will not participate in the auction because of increased costs for an unnecessary need. Hence, this type of the auction trading has a difficulty in provoking the participation and competition among those people who want to apply for the hire of things for a short-term and as a result, the effectiveness on the auction is reduced by limiting a range of participants to apply for the auction.

To solve the above problems, the auction trading should be carried out without setting the unit periods and, for the case of exceeding the preset unit period, it is necessary to allow people to apply for the hire of things as long as the applicant wants. However, the commonly practiced auction method may cause another problem.

Another problem of the common auction method is an evaluation of the unit prices and bid prices for bidders.

For instance, assuming that there are three people who wish to rent an item for a 7-day period, a 4-day period and a 2-day period, respectively, if the person who bids for the 7-day period and another person who bids for the 4-day period propose the same price, it is necessary to determine who will receive a priority. On the basis of an average unit price per one day, the person who bids the 4-day period will be an optimum bidder. However, according to the total price, the person who bids for the 7-day period provides the highest price and according to the average unit price, the person who bids for the 4-day period provides the highest price. Thus, it is necessary to set detailed evaluation particulars and procedures to determine and select an optimum condition.

If the applied renting periods of the three people are overlapped with each other, it is precedently determined and set which of the total price or the average unit price receives a priority of the evaluation, or both the total price and the average unit price are evaluated. Through this preset, it is possible to easily accomplish the desired trading. However, this auction trading type is realized when if one additional procedure being different from the common auction trading method is provided. That is, the procedure for setting the evaluation method whether to apply the evaluation based on the total price or the average unit price and determining the priority of the evaluation.

However, in case of the applied renting periods of the three people are partially overlapped or are not completely overlapped, utilizing the above evaluation method is not sufficient to realize the auction trading. Thus, it is necessary to set additional evaluation references and determination methods. That is, even if the total price is determined to be a priority of the evaluation, the person for the 7-day period may not provide the optimum condition. Also, if it is possible to divide the schedule of the person for the 7-day period and assign the divided schedule to the person for the 4-day period and the person for the 2-day period without interfering the schedule of each person, the total price for the above schedule is the addition of the person for the 4-day period and the person for the 2-day period, being greater than that of the person for the 7-day period.

In such case, compared with the case that each participant in the auction proposes a higher bid price, the auction initiator is able to maximize the profit when combining a number of the participants even if the bid price of each participant is lower.

Therefore, in the case of the auction of the hire of things, the common auction method evaluating only the bid prices proposed by the individual participants has a difficulty in realizing the trading. For this reason, to select an optimum bidder who could be an individual or a combined group, it is necessary to compare each individual with a combined group of the individuals or the combined group with another combined group in addition to the comparison of each individual. Also, instead of simply evaluating the total price or the unit price, an overall evaluation method that determines an optimum condition of the auction trading by examining the applied schedule and the total price in overall and then evaluating potentially combinable trading types is required.

In summary, according to the preferred embodiment of the present invention, the optimum auction method using the network includes sequential procedures to select an optimum bidder. First, an auction trading intermediary server is provided with an intermediary system capable of selecting the optimum bidder by analyzing proposals of the auction participants and evaluating the proposals in overall according to conditions of the auction and the evaluation method set by the auction initiator. The auction initiator inputs characteristics of an item to be auctioned, essential assets, evaluation particulars and evaluation methods including the evaluation particulars and evaluation references, and then, the auction participants apply for the auction through predetermined auction procedures. Subsequently, the overall evaluation is carried out with respect to the auction participants according to optimum auction procedures constructed in the intermediary system to select an optimum bidder who is close to the desired conditions of the auction initiator and maximizes the profit of the auction initiator. Once the auction trading is determined, the auction item is transferred to the selected optimum bidder through a direct or indirect means such as a courier service or a mail service and the bid price is paid to the auction initiator.

Advantageous Effects

On the basis of the proposed optimum auction method, an auction initiator and an auction participant are able to trade desired auction items in various auction trading types without being restricted through using a communications network. Since the optimum auction method selects a bidder who is most close to an intention of the auction initiator and able to maximize a profit, it is possible to achieve the maximum profit of the auction initiator. Also, because of this specific characteristic of the optimum auction method, it is possible to broaden a participation range of people interested in the auction and increase efficiency on the auction through various types of competitions.

DESCRIPTION OF DRAWINGS

FIGS. 4 and 5 are exemplified auction trading methods proceeding based on respective overall marking evaluation tables applied to an optimum auction method in accordance with the present invention; and FIGS. 6 and 7 are exemplified trading methods proceeding based on respective lease schedule tables applied to an optimum auction method in accordance with the present invention.

BEST MODE FOR CARRYING OUT THE INVENTION

Hereinafter, preferred embodiments of the present invention will be described in detail with reference to accompanying drawings.

Figure 1:
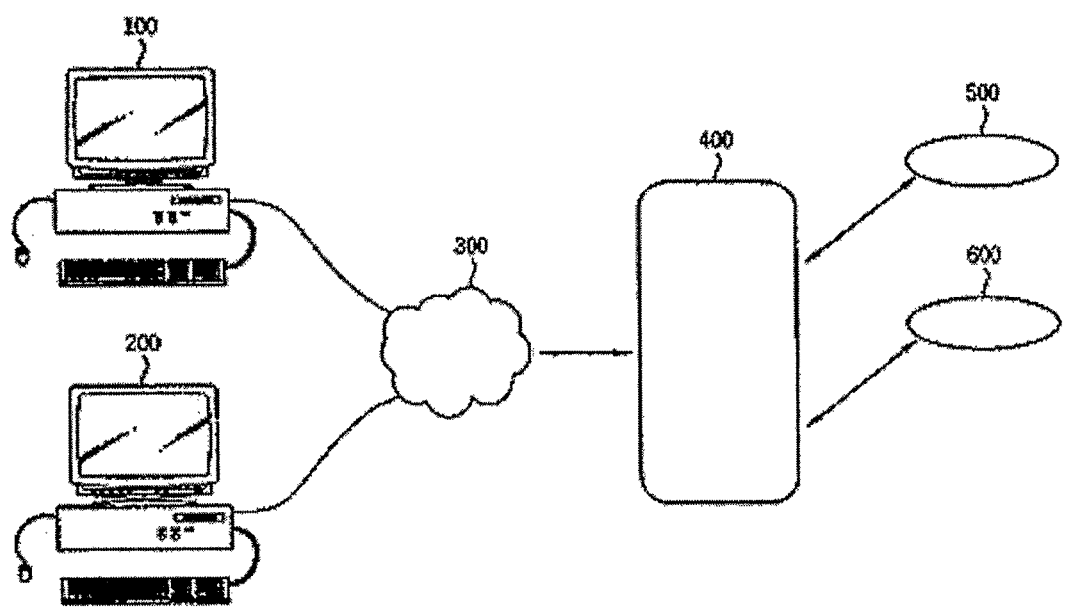
FIG. 1 is a diagram briefly showing a system to which an optimum auction method by using a communications network such as the internet is applied in accordance with the present invention.

FIG. 1 is a diagram briefly showing a configuration of a system to which an auction trading method using a network is applied in accordance with the present invention.

As shown, the system includes: a first terminal 100 for an auction initiator; a second terminal 200 for an auction participant; an auction trading intermediary server 400; a communications network 300 such as the internet; an insurance agency 500; and a settlement agency 600.

Herein, the auction trading intermediary server 400 analyzes conditions of the auction for an item that is to be traded between those people related to the auction and evaluates in overall the conditions suggested by those participants in the auction to select participant(s) who suggests the optimum condition. The selection of the participant is then followed by a creation of a contract note. The contract note is then downloaded to the first terminal 100 and to the second terminal 200, and the auction initiator and the selected auction participant are asked to draw up the terms of the contract. Herein, although the trading can proceed with using the contract note as described above, the decision to trade the item is sufficient even without drawing up the contract.

Figure 2:
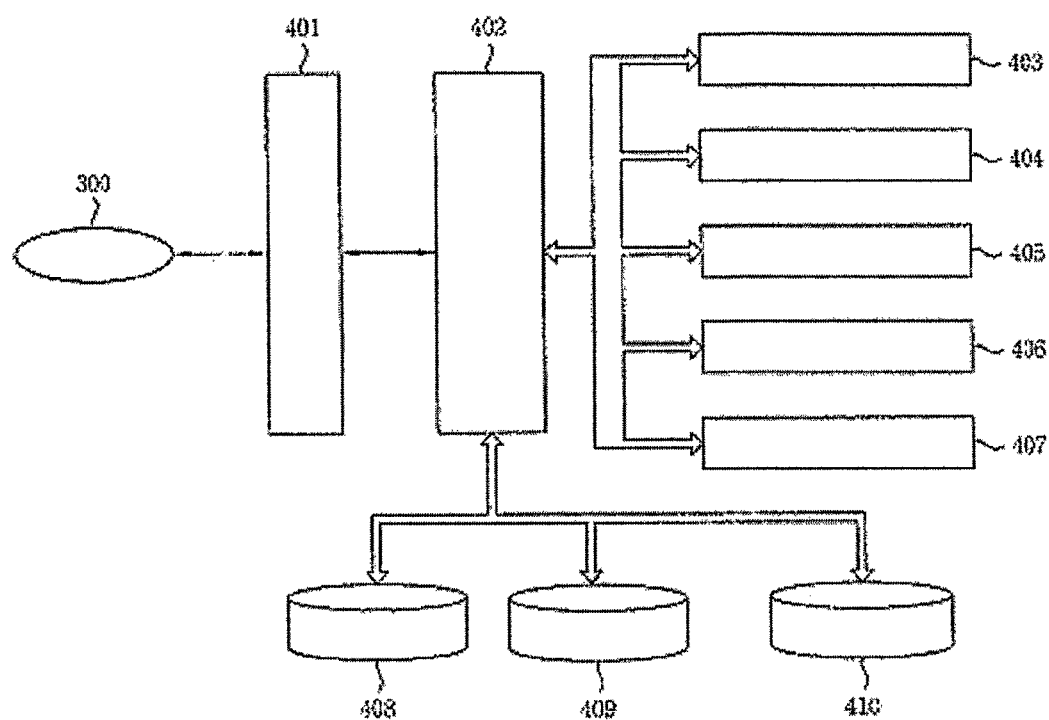
FIG. 2 is a block diagram showing one embodied configuration of an auction intermediary server depicted in FIG. 1.

Referring to FIG. 2, the auction trading intermediary server 400 includes: an interface unit 401; a control unit 402, which is a central processing unit; a contractor information analysis unit 403; a contract note detection unit 404; a verification unit 405; an encryption processing unit 406; a memory 407; a contract note database (DB) 408; a contract-related information database 409; a member-related information database 410. Other types of databases can be added depending on needs.

Herein, the interface unit 401 interfaces between the auction trading intermediary server 400 and the communications network 300. The contractor information analysis unit 403 analyzes information provided from the first terminal 100 and/or the second terminal 200 and detects a corresponding type of an auction and kinds of a target item for the auction. Among various forms of contract notes stored into the contract note database 408, the contract note detection unit 404 detects a contract note that accords with an auction item subjected to a contract between the first terminal 100 for the auction initiator and the second terminal 200 for the auction participant and a trading type and, adds numerous particulars to the detected contract note according to the analysis result from the contractor information analysis unit 403.

Also, the verification unit 405 verifies whether the contract note created by the contract note detection unit 404 is normal. At this time, the verification unit 405 asks the auction initiator of the first terminal 100 and/or the auction participant of the second terminal 200 to input an authentication means attached to the created contract note to the first terminal 100 and/or the second terminal 200 and then, verifies whether the inputted authentication means is normal.

The encryption processing unit 406 encodes that the contract note assigned by the auction initiator of the first terminal 100 and/or the auction participant of the second terminal 200 will be published and then, stores this encryption into the contract-related information database 409.

Also, the control unit 402 controls operations of the auction trading intermediary server 400. Especially, the control unit 402 determines whether to make a contract for the auction item between the auction initiator of the first terminal 100 and the auction participant of the second terminal 200 and detects a corresponding contract note thereafter. The control unit 402 also performs various control operations, for instance, the operation of asking the auction initiator of the first terminal 100 and/or the auction participant of the second terminal 200 to input an authentication means to the first terminal 100 and/or the second terminal 200. Furthermore, the control unit 402 analyzes conditions of the auction and a status of the bidding and performs an evaluation activity for the optimum auction.

Furthermore, the memory 407 stores a variety of programs operated by the control unit 402 and simultaneously stores temporary data generated as the control unit 402 operates the programs for a moment.

Figure 3:
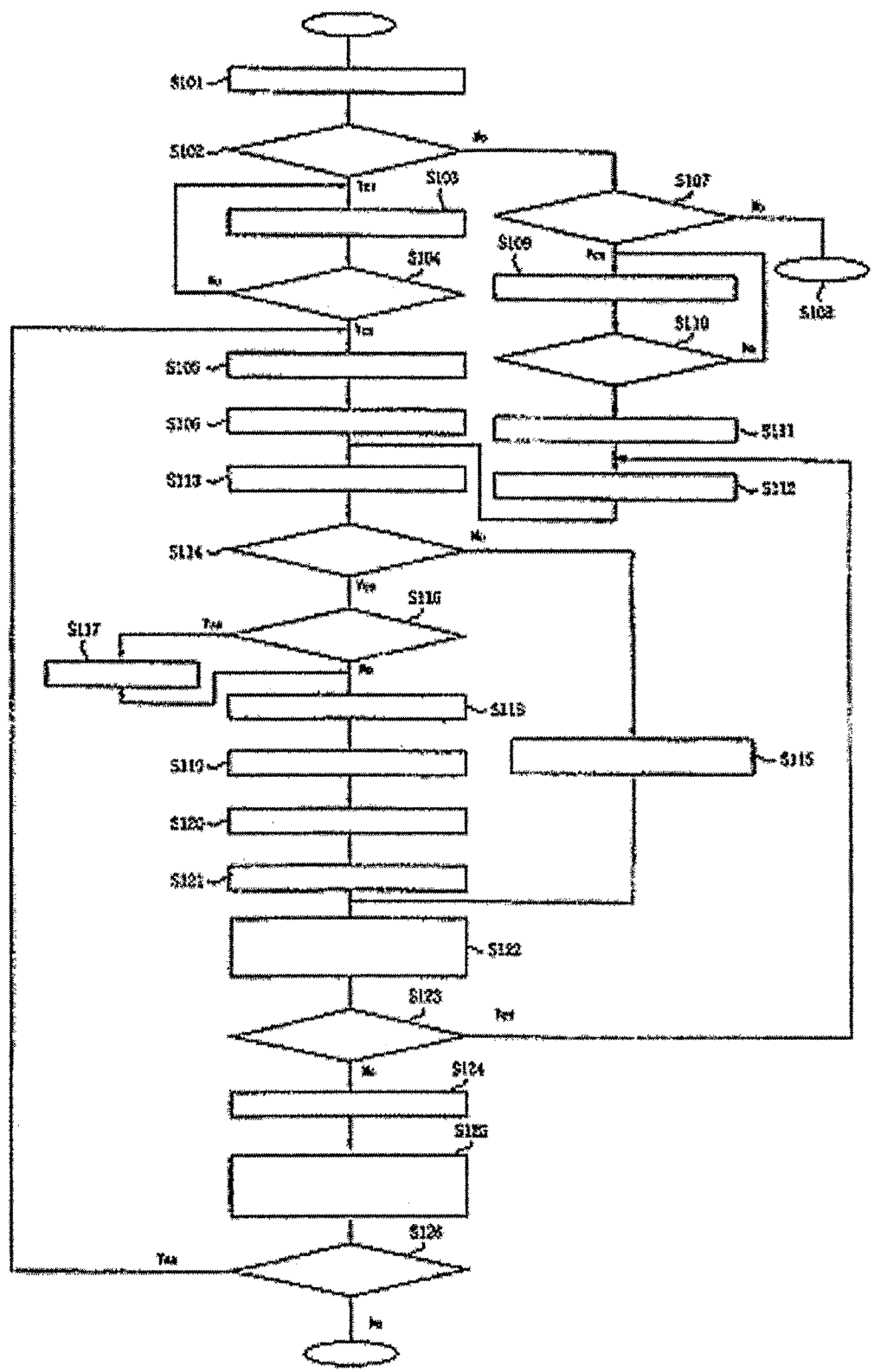
FIG. 3 is a flowchart describing a method for brokering an auction by using a communications network in accordance with the present invention.

FIG. 3 is a flowchart describing an optimum auction method using a network in accordance with the present invention.

As shown, there are sequential operations to proceed with the optimum auction. First, when a user is connected to the auction trading intermediary server 400, in the operations S101, S102 and S107, it is determined whether the user is an auction initiator or an auction participant. Then, in the operations from S103 to S106, if the user is the auction initiator, the user is asked to input information about characteristics of an auction item, essential assets for the auction, particulars for an evaluation, an evaluation method and so forth. Once this information is received, in the operations from S103 to S106, the information is stored. If it is determined that the user is the auction participant, in the operations from S109 to S112, the user is asked to input information about proposals for the auction. Once the inputted information is received, the information is stored in the operations from S109 to S112.

Afterwards, in the operations S113 and S114, the stored information on the auction inputted by the auction initiator and the stored information on the proposals for the auction inputted by the auction participant are compared with each other and searched thereafter. In the operation S115, if the essential assets for the auction defined by the auction initiator are not matched with the proposals made by the auction participant, the reason for a denial of the auction trade is informed to the auction participant. If the essential assets are matched with the proposals, it is determined how many people are participated in the auction. In the operations from S116 to S118, if one person is participated in the auction till a termination point of the auction set by the auction initiator, the auction participant and the auction initiator are informed that the trade is succeeded.

If there are a number of participants in the auction, overall evaluations are analyzed based on particulars for the evaluation and methods of the evaluation and then compared with each other to select an optimum bidder. After the bidder is selected, the completion of the auction trade is notified to the auction initiator and the selected bidder, and afterwards, in the operation S119, a contract note is created. In the operations S120 and S121, a settlement process is carried out, and the auction item is delivered.

If a number of auctions are scheduled to be held consecutively according to a predetermined timetable, in the operation S122, each auction activity is carried out consecutively until reaching a point of terminating the auction. Also, in the operation S123, it is determined whether another auction trade is possible for those participants who are not selected as a successful bidder for the previous auction event according to the schedule or whether there is a new participant. If the determination is positive, then, the auction trade is instigated again. Once it is confirmed that the auction is successfully completed, in the operations S124 and S125, payments for the bid price, security deposits and so on are carried out. In the operation S126, it is checked whether there is a remaining item for a next auction event or more scheduled time for the auction event. If the checking result is positive, then the rest participants are allowed to bid for the auction, and otherwise, the auction event is terminated.

In more detail of the optimum auction method using the above described network, in the operation S101, the auction initiator or the auction participant is connected to the auction trading intermediary server 400 through the communications network 300 by using the first terminal 100 or the second terminal 200. Once the user, i.e., the auction initiator or the auction participant is connected, in the operation S102 and in the operation S107, the control unit 402 of the auction trading intermediary server 400 determines whether the connected user is the auction initiator or the auction participant. Herein, the determination of the auction initiator and the auction participant can be easily distinguished by precedently creating two icons for the auction initiator and the auction participant on the main screen. If the user is determined to be neither the auction initiator nor the auction participant, the operation S108 is instigated to return to the first operation S101 or to monitor a desired trading status.

Meanwhile, if it is determined that the user is the auction initiator, the operation S103 starts to request the auction initiator to input information related to the auction. In the operation S104, it is checked whether the auction initiator inputs the acquired information. Once the auction related information is inputted, in the operation S105, the auction-related information is received, and in the operation S106, the received information is stored into the memory 407.

At this time, the auction-related information includes as follows. The auction initiator provides characteristics of an item for the auction and sets essential assets for the auction. Also, on the basis of characteristics and an intended level of profit, the auction initiator discretionarily adds those particulars for an evaluation for comparing and evaluating participants in the auction are inputted to select an optimum bidder close to the taste or intention of the auction initiator or able to maximize a profit of the auction initiator among those participants who satisfy the essential assets and reference scores for the evaluation particulars. Further, as for the auction-related information, the auction initiator sets an evaluation method along with the essential assets for the auction. Hence, within the range of satisfying the essential assets, participants can apply for the auction being distinguished from each other with different proposal conditions with respect to a price as well as various particulars.

The auction can proceed under a trading scheme set under an overall marking table to easily check a proceeding status of the auction and proposals for the auction between a number of participants and trade with each other. Such a trading form including an overall marking table as shown in FIG. 5 is programmed into the auction trading intermediary server 400, and when the auction initiator selects the trade based on the overall marking table, an evaluation basis, an evaluation score, an evaluation rank and the like are displayed in real-time, so that the participants can make a bid after checking these provided information. Also, the auction trading intermediary server 400 includes a virtual evaluation unit for allowing a participant to simulate how those proposals made by the participant are to be evaluated before the participant applies for the actual auction. As a result of this simulation, the participant is able to decide easily about the proposal for the auction.

In the mean time, in the course of inputting the auction-related information and essential assets, the auction initiator can select a desired auction trade type such as a reverse auction, a lease auction, a reverse lease auction or the like. Once the desired trade type is inputted, the auction trade proceeds according to preset auction procedures, for instance, a person who initiates the auction, a person who will pay a bid price.

If the user is determined to be the auction participant in the operation S107, the auction participant is requested to input information on the proposal for the auction in the operation S109. Afterwards, in the operation S110, it is checked whether the acquired information is inputted by the auction participant. Once the acquired information on the proposal for the auction is inputted, in the operation S111, the acquired information is received and, stored into the memory 407 in the operation S112.

Subsequently, in the operations S113 and S114, the auction-related information inputted by the auction initiator and the proposal information inputted by the auction participant are compared with each other and searched thereafter. If the essential assets provided by the auction initiator are not matched with the proposal information, the operation S115 is instigated to notify the reason for a denial of the auction trading to the auction participant. If the proposal information satisfies the essential assets, in the operation S116, it is checked whether there exist a number of participants in the auction. If there is one participant until the auction is terminated, in the operation S118, the auction initiator/auction participant is informed that the auction trading is effected.

In the case that there are multiple participants who provide the proposals for the auction matched with the essential assets set by the auction initiator, in the operation S117, the proposals for the auction made by the participants are analyzed and evaluated in overall based on scores marked with respect to the evaluation particulars set by the auction initiator. After the overall evaluation, a participant who provides the optimum proposal is selected as a successful bidder, and then, the auction initiator/participant is informed that the auction trading is effected.

Herein, if the auction initiator selects the lease auction in which the auction initiator, who is a lessor, receives the payment for the lease from a lessee, a participant who is most close to the taste and intention of the auction initiator and maximizes a profit, i.e. a price that give the maximum profit, is selected. In case of the reverse auction in which the auction initiator pays an amount of money to the successful bidder as purchasing or renting an item/property, a participant who is most close to the taste or intention of the auction initiator and maximizes a profit, i.e., a price that gives the minimum cost, is selected. In case of the reverse auction in which the auction initiator pays an amount of money to the successful bidder as selling or leasing an item/property, a participant who is most close to the taste or intention of the auction initiator and maximizes a profit, i.e., a price that gives the minimum cost, is selected. In case of the reverse auction in which the auction initiator receives the payment from the successful bidder as purchasing or renting an item/property, a participant who is most close to the taste or intention of the auction initiator and maximizes a profit, i.e., a price that gives the maximum profit, is selected.

In the above mentioned various types of the auctions, if the auction initiator selects the lease auction or the reverse lease auction, one evaluation can be additionally applied to achieve the optimum auction. For the lease auction or the reverse lease auction, there is a frequent case that the lease can take place by combining a number of participants according to a schedule of the lease/hire of things. Thus, when the auction participants are evaluated, these combined participants are considered as one group and then, one addition procedure of selecting an optimum bidder who could be an individual person or a combined group most close to the taste or intention of the auction initiator and maximizes a profit through comparing proposals made by the individuals as well as those proposals made between the individual and the combined group or those proposals made between the combined groups.

The combined group arises as the central processing unit combines groups applicable for a common lease for every number of probable cases by using a program installed within the auction trading intermediary server 400 in consideration of lease schedules, a point of terminating the auction for each lease schedule and application schedules of auction participants. Also, those auction participants, who reciprocally affect the lease trading because of the schedule, are simultaneously compared and evaluated with each other. It is still possible not to combine certain groups depending on needs.

In case that the auction trading is in the type of lease, the basic lease information includes a lease period, a point of terminating the auction for each schedule within the lease period as the major auction conditions set by the auction initiator.

A person who wishes to lease can set the overall lease period as desired for XX times, Y days, D weeks, F months, C years and so forth and can also set a basic unit period of the lease or without a restriction in the basic unit period as well as an available lease period and a minimum lease period. Also, the leasing conditions can be differentiated by differently applying the minimum lease price or the unit price that can set to be varied according to the lease schedule or, a surcharge rate, a discount rate or the like. In addition, the overall available lease period can be divided into each sectional period depending on needs, so that the separate auction trading is possible for each section period, and a single or a number of participants who wish to rent is or are able to participate in the trade for the overall lease period or for each sectional period. That is, depending on the selection of the inputted conditions set by the person who wished to lease, the overall lease period or the sectional periods can be divided into a plurality of sub-sections depending on requests made by the participants who wish to rent, thereby enabling a plurality of trading activities.

In other words, the available lease period registered as in the overall period or in the divided sectional periods by the person who wishes to lease is traded by being divided into several sections of periods upon requests made by the participants who wish to rent. Particularly, the plurality of rent-wanted participants can discretionarily select a desired period over the overall or sectional period of the available lease period registered by the lease-wanted person to thereby participate in the auction trading.

Also, a trading mode that is based on a schedule table is employed to easily verify a proceeding status of the lease event and schedules of a number of participants and trade reciprocally. The lessor marks the available lease period and the unavailable lease period on the schedule table in the form of a calendar as depicted in FIG. 6 and, sets evaluation methods such as the lease condition, the basis for the lease priority for the auction and so on. Then, the lessee checks these provided conditions and inputs a desired rent date and a unit price and can participate in the trading after verifying how many people participate in the rent event, a priority rank in a bid, an evaluation mark, an evaluation price and so forth.

Furthermore, several subsequent contracts are allowed as the termination point of each lease can be continued until the last available lease period of the overall available lease period upon the lease-wanted person's specific set, or the termination point of each lease can also be early terminated. That is, in the former case, in consideration of a transfer period of an item/property to be leased, the auction for a precedent date to a lease determination date for each available lease date based on the schedule table is terminated, and other subsequent lease trading events are continuously carried out until the last available lease period. In other words, although the lease-wanted person precedently sets the condition for the determination of the lease period, the termination point of the auction for each assigned date is determined depending on a status that how many people who are able to participate in subsequent lease trading activities apply for the rent event instead of terminating the auction of the whole available lease period by one lease contract.

The transfer period of the item/property to be leased is one essential asset for the lease activity and, may take one day or several days depending on the item/property to be leased. Thus, the trading should be carried out by securing a required period including a period for depositing an amount of money and a transfer period of the item/property before the desired date of the lease, and especially, the securing of the required period is critical when a plurality of rent-wanted people participated in the lease auction. Therefore, in consideration of the required period, the lessor precedently inputs or selects a lease determination period for each available lease date prior to a predetermined date. It should also be noted that in case of the auction, the termination period of the auction for each period is not the overall auction termination period. As a result of the precedent input or selection of the lease determination period, each available lease date includes an individual lease determination period. Hence, if the rent event is consecutively applied for several days, among numerous desired lease dates, the lease determination period of the first day represents the lease determination period for those applicants for subsequent rent events held consecutively and is also determined as a reference point of evaluating the lease determination period during an evaluation of other rent-desired participants.

Therefore, if the lease-wanted person inputs the overall available lease period and conditions, the auction trading intermediary server 400 evaluates the participation of those people who wish to participate in the leasing activity and participating conditions and then, select an optimum person who wishes to rent. If a certain person consecutively applies for the rent event for several days when a number of rent-wanted people participate in the auction, among a plurality of desired renting dates, the first starting date is determined to be an overall reference date of consecutive desired renting dates and, the lease determination period is applied. This procedure is identically applied to other rent-wanted people to be used as a relative comparative reference for selecting a rent-wanted person. That is, the person who wishes to lease selects the lease determination period for each available leasing date prior to a predetermined date, the lease determination period can be retroactive to a specified date depending on a participation status of those participants who wish to rent. Based on the retroactive determination period, an evaluation in the total price, the average unit price, the renting period and so on are carried out to select an optimum person who participates in the rent event.

Therefore, when there are a number of participants who wish to rent and a desired renting period and a point of renting are partially or entirely overlapped with each other or within a range of the effective trading, for instance, the transfer period of the item to be leased, a time limit in determining the lease is applied for each day of the lease to achieve an overall evaluation. However, the evaluation is not applied to each overlapped desired date of the rent; rather, the time limit in determining the lease is applied based on a starting date of the rent during a period for which the rent-wanted participants have applied, and the bidding conditions are compared with each other based on the same reference point.

In case of leasing an item/property according to a schedule table for an elongated period, if there is a date in which nobody applies for the rent, a lessor can modify the unit price or condition, or the schedule for an unavailable leasing date or an available leasing date to continue the lease trading. Herein, the same conditions are maintained for the previous contract for the lease.

Meanwhile, in the lease auction, upon a condition set by the lessor, such a lease trading is possible with consideration of depreciation in that an item/property that is to be leased can be taken as a property of a lessee without returning the item/property to the lessor if the leasing activity continues for more than a certain period. For this type of trading, the lessor can select a final proprietor discretionarily among a lessee who will rent for a long period, a person who proposes the highest bid price, a final lessee and the like, or through a random selection.

Also, if there are a number of lessees, a transportation cost and a period of losing the leasing opportunity arise in the course of communicating between the lessor and the lessees and trading between the lessor and the selected lessee. Thus, in consideration of this amount of loss in the leasing opportunity, a lessee who proposes an optimum renting condition is selected. If the lessees propose the same rent price within the limited time, instead of selecting a short-term lessee, a long-term lessee is preferably selected because the long-term lease gives a less amount of loss. If the unit prices are different, a procedure for calculating an amount of loss is performed to select an optimum lessee.

If the lease continues because of the lessees exist consistently, the leased item/property is returned to the lessor and then, leased again to a subsequent lessee. The precedent lessee can also transfer the leased item/property directly to the subsequent lessee, thereby reducing distribution costs and the period of losing the leasing opportunity caused by the return and transfer.

As for the reverse auction, the lease auction and the reverse lease auction, in addition to the characteristics of an auction item, the bid price and the period, the essential assets set by the auction initiator can even include certain qualifications like ages of the auction participants and sex. Also, the auction initiator can set evaluation particulars for those auction participant qualified for those essential asset and evaluation marks or ranks for each asset of the evaluation particulars. As mentioned above, the evaluation particulars can also be discretionarily set by the auction initiator. In this case, a bidder is selected after evaluating based on a priority evaluation rank. If the priority evaluation rank is the same, the next evaluation particular is evaluated to select a bidder.

Hence, under the above-descried auction procedures, even though one auction participant has a priority over other participants in a bid price, this bid price priority does not guarantee the successful bidder if there is a participant who is most close to the taste and intention of the auction initiator or is able to maximize the profit. Such the evaluation and selection of the bidder close to the taste and intention of the auction initiator and able to maximize the profit is operated by using a program installed in the auction trading intermediary server which analyzes conditions set by the auction initiator and applications of the auction participants.

For instance, in case of an auction for a vehicle, assuming that the auction initiator sets essential assets for this auction by limiting a displacement greater than approximately 2,000 cc, energy efficiency above a medium level and a bid price lower than approximately 30,000,000 wons and evaluation particulars including the energy efficiency level and an air bag, in view of a buyer, even though the price is high, if the energy efficiency level is high, it is possible to reduce usage costs, and if the air bag exists, an security effect can also be achieved. Thus, these particulars, price and so on are marked so as to be evaluated in overall. If the price is most important, an evaluation mark for the price is set high, while marks for the rest evaluation particulars are set low.

FIGS. 4 and 5 are exemplified trading methods based on respective overall marking evaluation table applied to an optimum auction method in accordance with the present invention.

Especially, in FIG. 4, an auction initiator sets essential assets by including a price lower than approximately 15,000,000 wons and a displacement greater than approximately 2,000 cc and, gives evaluation particulars and marks in that a proposed bid price lower than approximately 10,000,000 wons, approximately 12,000,000 wons, approximately 13,000,000 wons are scored 30 points, 20 points, 10 points, respectively; the displacement exceeding approximately 2,000 cc is scored 5 points for every approximately 100 cc; manufacturing companies of Hyundai, Toyota, and others are scored 10 points, 5 points and 3 points, respectively; and vehicle colors of white, blue and red are scored 10 points, 5 points and 3 points, respectively. These evaluation particulars are evaluated in overall to select the optimum bidder, and when scored the same, the evaluation proceeds according to a priority of the evaluation rank preferably in order of the price, the manufacturing company, the color and the displacement.

FIG. 5 shows an exemplary case of purchasing a plane ticket. Specifically, an auction initiator sets essential assets by including a departure, a destination, a boarding date and a price and registers evaluation particulars such as a seat location, a travel path, a price, a boarding time and evaluation reference marks with respect to the evaluation particulars. Then, based on the overall evaluation marking scheme, an optimum condition most close to the intention of the auction initiator is searched to establish an intended trading.

For instance, if the auction initiator sets essential assets as departing on Dec. 1, 2005 from Incheon Airport and arriving at San Francisco with a fare lower than approximately 1,200,000 wons, and adds evaluation particulars and specific marks with respect to the evaluation particulars in that 5 points are scored for every balance of approximately 100,000 wons from the set fare of approximately 1,200,000 wons; a non-stop path and one stop-over path are scored 10 points and 5 points, respectively; a window-side seat, an aisle-side seat and a middle seat are scored 5 points, 3 points and 1 point, respectively; and Korean Air Lines, UA and other companies are scored 10 points, 5 points and 3 points, respectively.

FIG. 6 shows one exemplary trading method based on a schedule table for a lease in accordance with the present invention.

In FIG. 6, a person who wishes to lease sets conditions as follows. First, a minimum unit period for the lease is more than 2 consecutive days; a time limit for determining the lease is prior to 4 days from a desired date of the lease including 2 days of a transfer period; an evaluation method of a bidder is either an overall evaluation or a rank-based evaluation; in case of the rank-based evaluation, a priority goes in order of a total price, an average unit price and a first-come first-served basis; and a consecutive renting application is evaluated based on one application which is not divisionally evaluated. According to the schedule table, from April 1 to 26, the overall evaluation method is selected while the rank-based evaluation method is selected from April 27 and 28.

Herein, the lease-wanted person registers April 1 and 2 as available dates and sets the required transfer period to a subsequent lessee for 2 days. Since the lease-wanted person is in contract with a precedent lessee, it is indicated in the schedule table that the lease is unavailable from April 2, which is the last contracted date of the precedent lessee to April 4, which is 2 days from April 2.

On April 5, according to a specific set by the lease-wanted person, the lease determination date and time is set at 00:00 on April 1, which is 4 days before this available date. On April 6, according to a specific set by the lease-wanted person, the lease determination date and time is set at 00:00 on April 2, which is 4 days before this available date.

From April 7 to 10, as like the previous cases, the lease determination date is set prior to 4 days. However, a second bidder, Dong-Won Choi, proposes a rent period of consecutive 5 days from April 6 to April 10, and thus, this case is treated as one lease application. Hence, the lease determination date of the entire desired rent period is set at the first date of the desired rent period, which is April 6. A date of April 11 is the last day of the rent for a first bidder, Dong-Ryeol Sun, and although the applied renting period of the first bidder continues for 4 consecutive days from April 8 to April 11 is treated as one lease application, the applied renting period by the first bidder is overlapped with that by the second bidder. Thus, the lease determination date of the first bidder is determined to the lease determination date of the second bidder to perform a reciprocal evaluation on these two bidders. When the desired renting periods proposed by a number of participants who wish to rent are overlapped with each other, the lease determination date is set at the first prior date among variably set desired renting dates for the purpose of evaluating these multiple number of participants.

Although a date of April 12 is not overlapped with desired dates of the participants, this date is only one day apart from a schedule of a precedent rent-wanted person. Thus, if the contract is established with the precedent rent-wanted person, the rent is not possible in consideration of 2 days of the transfer period. Thus, it is necessary to evaluate the present rent-wanted person along with the precedent rent-wanted person to determine the optimum bidder. For this reason, when the applied desired renting periods proposed by many participants are overlapped with each other or within an effective trading day including the transfer period, in this case, 2 days, the participants corresponding to these cases are evaluated together to select the optimum trading with consideration of an amount of loss caused by the transfer period.

As for a third bidder, Tae-jee Seo, there is 0 day of the secured transfer period with respect to the first bidder and only 1 day of the secured transfer period with respect to the second bidder. Thus, since the applied renting period of the third bidder is within the effective transfer periods for the first bidder and the second bidder, the lease determination period of the third bidder is also set at 00:00 on April 2.

The second bidder applies the rent from April 22 to April 24, he/she is treated as a separate applicant, this rent application is evaluated separately from another application from April 6 to April 10. That is, those applications separated for more than the set transfer period are treated as different applications.

Therefore, the auction trading is determined to select the third bidder who suggests the highest bid price, renting from April 12 to April 15 at approximately 200,000 wons. The second bidder is selected to rent from April 22 to April 24 at approximately 140,000 wons.

The above-descried cases are applied with the overall evaluation method. For those dates of April 27 and 28, it is set to apply the rank-based evaluation method. Thus, the second bidder and the third bidder are in the same priority under the first ranked priority of the total price, i.e., both approximately 70,000 wons, and since these two bidders are in the same priority for the second rank priority of the average unit price, the third rank priority of the first-come first-served basis is applied, selecting the second bidder who is prior over the third bidder in respect of the first-come first-served basis.

In FIG. 7, a person who wishes to lease sets conditions as follows. First, a minimum unit period for the lease is more than 2 consecutive days; a time limit for determining the lease is prior to 4 days from a desired date of the lease including 2 days of a transfer period; an evaluation method of a lessee is either an overall evaluation or a rank-based evaluation; in case of the rank-based evaluation, a priority goes in order of an average unit price, a total price and a prior sale; and a consecutive renting application is evaluated based on one application which is not divisionally evaluated. According to the schedule table, from April 1 to 24, the overall evaluation method is selected while the rank-based evaluation method is selected from April 25 and 28.

Although the trading type and determination method are identical to those described in FIG. 6, the lease still can vary depending on conditions of the bidders. For instance, the second bidder has the highest priority rank by proposing the total price of approximately 200,000 wons. However, the first bidder and the third bidder have the sufficient transfer period of 2 days between those applied periods, and thus, when the first bidder and the third bidder are selected from the trading, the total bid price becomes approximately 240,000 wons greater than that of the second bidder. Accordingly, the auction trading intermediary server 400 evaluates the first bidder and the third bidder as the optimum lessees.

The above circumstance for realizing the trading is possible because of the following reasons. The applied periods of many bidders are overlapped with each other and the applied renting period of the third bidder is one day apart from that of the other bidder but within 2 days of the transfer period, and thus, the third bidder is applied with the same lease determination date and time to those of the other bidders. Also, 2 days of the transfer period of the third bidder are secured with respect to that of the first bidder and as a result, the third bidder and the first bidder are allowed for the auction trading.

The above-described case dated of April 1 through April 24 is applied with the overall evaluation method. However, from April 26 to 28, the rank-based evaluation method is applied. In more detail of a bidding status according to the rank-based method, although the first bidder is prior to the other bidders in respect of the total price, the second bidder who proposes the average unit price of approximately 40,000 wons is selected since the average unit price is prior to the total price according to the rank-based evaluation method.

Next, the operation S119 described in FIG. 3 is instigated to create an On-line contract note, and then, in the operation S120, the settlement procedure for the contract is carried out. Herein, during the settlement, in the event that the auction initiator precedently sets a security deposit for those potential cases of damage, lost and cancellation of the trading in the course of inputting the auction-related information, the successful bidder deposits the certain amount of money set by the auction initiator to the insurance agency 500 or a broker. If the trading is normally completed, the successful bidder can get a refund of the security deposit.

After the settlement procedure, in the operation S121, the auction item is transferred to the successful bidder. Afterwards, in the operation S122, the contracted auction status and non-contracted auction status are displayed, so that the next participants can apply for the auction. Depending on the presence of the next auction participants determined in the operation S123, the auction procedure goes back to the operation S112 when there is the next auction participant. If otherwise, in the operation S124, it is verified whether each contracted auction is executed as in the contract. Then, in the operation S125, the payment of the selected bid price is settled and a balance from the security deposit is refunded. It is also checked whether there is any remain item for the next auction event in the operation S126. If the checking result is positive, the auction procedure goes back to the operation S105, and if otherwise, the auction is terminated.

INDUSTRIAL APPLICABILITY

On the basis of the preferred embodiments of the present invention, the optimum auction method is proposed as one approach to overcome limitations in the typically practiced auction method. Grounded on this proposed optimum auction method, various auction trading types such as the optimum reverse auction, the lease auction and the reverse lease auction can be implemented by employing a network like the internet. It is evident that this proposed optimum auction method can be modified for the application to many other trading types.

Also, an item to be auctioned according to the optimum auction method can be various tangible and intangible items including photocopiers, water purifiers, medical devices, automobiles, information, technology, rights, real estates, membership, advertisements and so forth.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. An optimum lease auction method by using a network through which a lessor receives a payment from a lessee and an auction item is leased, the optimum lease auction method comprising the steps of: connecting a first terminal of a lessor, a second plurality of terminals of lessees, an auction trading intermediary server installed with an intermediary program, an insurance agency and a settlement agency to the network including the internet;

receiving a plurality of lease criterions from the lessor via the network and storing the received lease criterions in a lease database, wherein said lease criterions includes a property to be leased, a lease schedule, lease conditions, evaluation particulars, evaluation methods, evaluation reference marks, and evaluation priority ranks;

receiving a plurality of rent criterions from the plurality of lessees via the network and storing the received rent criterions in a rent database, wherein said rent criterions includes at least one of desired rent periods, rent schedules, and a bid prices;

generating a plurality of lease configuration groups for every possible combinations of participating lessees, wherein said lease configuration group is formed by combining a plurality of lessees in a sequence throughout the provided lease schedule, without overlapping the rent schedules of each combined lessees, and irrespective of individual bid prices;

calculating a plurality of individual bid values for each of the participating lessees by multiplying the bid price of the participating lessee by the rent period provided by the corresponding lessee;

calculating a plurality of group values for each of said lease configuration groups by summing the individual bid values of the participating lessees belonging to each of the given lease configuration group;

selecting an optimum lease configuration group, via the network, wherein the optimum lease configuration group has the highest group value conforming to the lessor's evaluation method, evaluation particulars, evaluation reference marks and evaluation priority ranks;

informing the lessor and the selected optimum lease configuration group members about the optimum lease group selection result and their status as successful bidders, using at least one of an e-mail, an advanced record system ("ARS") service or a short message service ("SMS");

finalizing a plurality of lease contracts between the lessor and the lessees of the optimum lease configuration group by allowing the lessor and the lessees to verify and confirm the previously entered lease criterions and the rent criterions, wherein said lease contracts are stored in a contract database;

receiving verification information from the terminals of the lessor and the lessees of the optimum lease configuration group regarding statuses of lease payments, security deposits and transfer of lease property, and transmitting the verification information to the insurance agency and the settlement agency, wherein the verification information is stored in a trading database; and analyzing the lease database and the contract database to find remainder of lease period available for additional lease, and performing additional auction events while available lease period remains.

2. The optimum lease auction method of claim 1, wherein when the lessor separately assigns a lease determination date for each desired lease date when inputting the lease criterions or discretionarily sets the lease determination date prior to a predetermined date, the auction trading intermediary server terminates auction events sequentially by applying the individual assigned lease determination date as a basic reference; when each applied renting date applied by the lessee is consecutive or inconsecutive within a range of a preset transfer period of the property to be leased, said each applied renting date is treated as one rent application and a first starting date is determined as a representative date of a consecutive renting period for which a lease determination period is applied conjointly; and when the applied renting dates by a plurality of lessees are overlapped with each other and are affected with each other, the auction trading intermediary server controls the lease determination date of the corresponding lessees to be set at the lease determination date of a lessee assigned with a first precedent lease determination date among the lessees in order to apply a relative comparative evaluation with respect to conditions of the corresponding lessees according to a predetermined reference mark, so that an optimum lessee is evaluated and selected by flexibly adjusting the lease determination dates set by the lessor according to the applications of the lessees.

3. The optimum lease auction method of claim 1, wherein when the lessor inputs a condition of the lease trading in that the lease takes place over an entire available lease period without a restriction or for each divided period of the entire available lease period and various other lease conditions including a unit price based on the lease period, a lowest lease price, a minimum lease period, a surcharge rate, and a discount rate and evaluation methods, the auction trading intermediary server stores the inputted condition of the lease trading, the various other lease conditions and the evaluation methods into the lease database, allows the plurality of lessees to re-divide one of the entire available lease period and the divided periods as much as necessary and selects the re-divided period; and when the lessee inputs rent criterions, the central processing device stores the rent criterions into the rent database and evaluates a status of the bidding in overall according to each separated condition to allow one of a person and a combined group providing an optimum condition to be selected as a successful bidder.

4. The optimum lease auction method of claim 1, further comprising the steps of: providing a schedule table in the form of a calendar, wherein the schedule table shows the lease schedule, the rent schedules of the currently selected optimum lease configuration group, and an auction proceeding schedules; updating the schedule table in real-time as a new perspective lessee enters the auction or the pre-existing perspective lessees modify the rent criterions; and displaying the updated schedule table on the terminals of the lessor and the lessees throughout the auction proceedings to promote the perspective lessees to change the rent schedule or increase the bid price.

5. The optimum lease auction method of claim 1, wherein the lease criterions of the lessor and the rent criterions of the lessees include a plurality of conditions for transferring the title of the lease property at the end of the lease schedule in consideration of depreciation in the leased property.

6. The optimum lease auction method of claim 1, further comprising the steps of: analyzing the rent criterions of lessees stored in the rent database to generate an optimal chain of sequence for transferring the lease property directly from a preceding lessee to a subsequent lessee without having to return the leased property back to the lessor, thereby reducing the distributing costs and maximizing the total duration of lease period; re-evaluating the optimum lease configuration group stored in the evaluation database in consideration of the optimal chain of sequence; and informing the lessor, the preceding lessee, and the subsequent lessee of the transfer and collection methods through at least one of an e-mail, an ARS, or a SMS, so that transferring and collecting of leased property is facilitated in a controlled manner.

7. The optimum lease auction method of claim 1, further comprising the steps of: displaying an icon on the terminals of the lessor and the plurality of lessees for allowing the lessor and lessees to modify the lease criterions and the rent criterions during the auction proceedings before the contract is finalized for a given lease period; requesting the lessor and the lessees to modify the lease criterions and the rent criterions for modification allowable lease period when the lessor or the lessee selects the icon displayed on their respective terminals; and updating the lease criterions stored in the lease database and the rent criterions stored in the rent database upon receiving the modification from the lessor and the lessee, so that the auction proceeding is carried out with the modified lease criterions and rent criterions.

* * * * *